United States Patent [19]
Easterly

[11] 3,952,988
[45] Apr. 27, 1976

[54] STEERING WHEEL MOUNTED DESK BOARD

[76] Inventor: Herbert D. Easterly, 117 W. Cleveland St., Crossville, Tenn. 38555

[22] Filed: Jan. 17, 1975

[21] Appl. No.: 541,733

[52] U.S. Cl. .............................. 248/441 B; 108/44
[51] Int. Cl.² .......................................... A47B 19/00
[58] Field of Search ...................... 248/441; 108/44; 224/29 E

[56] References Cited
UNITED STATES PATENTS

| | | | |
|---|---|---|---|
| 2,487,536 | 11/1949 | Fiscus | 108/44 |
| 2,663,576 | 12/1953 | BErman | 224/29 E |
| 3,011,802 | 12/1961 | Ackerman | 224/29 E |
| 3,643,606 | 2/1972 | Vise | 108/44 |
| 3,739,478 | 6/1973 | Elenberger | 108/44 |

FOREIGN PATENTS OR APPLICATIONS

| | | | |
|---|---|---|---|
| 1,416,622 | 9/1965 | France | 108/44 |

Primary Examiner—Roy D. Frazier
Assistant Examiner—Darrell Marquette
Attorney, Agent, or Firm—Jenkins, Hanley & Coffey

[57] ABSTRACT

For use on a truck steering wheel having a central hub, an outer peripheral rim, a plurality of spokes extending radially outwardly from the hub to support the rim and a horn button on the hub extending axially above the level of the rim, a removable desk board providing a generally flat upwardly facing work surface and a downwardly facing mounting surface. The mounting surface is contoured to provide a downwardly opening recess for receiving the horn button in the upper portion of the hub and downwardly projecting means for engaging the top of the wheel rim to secure the board on the wheel.

2 Claims, 5 Drawing Figures

STEERING WHEEL MOUNTED DESK BOARD

The present invention relates to steering wheel mounted desks, and more particularly to the provision of a desk board ideally suited for use on a truck steering wheel having a central hub, an outer peripheral rim, a plurality of spokes extending radially outwardly from the hub to support the rim and a horn button on the hub extending axially above the level of the rim. The desk board of the present invention is proportioned and designed to mount securely upon the rather large steering wheel of trucks to provide the truck driver with a convenient and readily accessible desk for use in making the many reports and computations required of truck drivers. Presently, many interstate truck drivers have to spend as much time as one hour per day keeping their log books, making their reports, etc. Since quite a bit of a driver's time is spent sitting in his truck waiting, for refueling, loading or unloading, or just simply resting, all of the necessary writing can be done on the steering wheel provided the driver has a desk board which is stable upon the wheel and which is proportioned and designed to fit upon the wheel. I have provided such a desk board.

Other people have suggested various types of writing boards for mounting upon steering wheels. The following U.S. Pat. Nos. are believed to be representative of the prior art: Cardarelli 1,892,721 issued Jan. 3, 1933; T. Wolfe 2,661,222 issued Dec. 1, 1953; Berman 2,680,325 issued June 8, 1954; Wadsworth 2,862,328 issued Dec. 2, 1958; Levandowski 3,281,109 issued Oct. 25, 1966.

No one of the prior art desk boards, in my opinion, has been suitable for use on truck steering wheels. One feature of truck steering wheels not accommodated by the prior art devices is the fact that the hub of the wheel and the horn button thereon extend axially above the level of the rim of the wheel such that a flat board will not rest upon the rim. My desk board provides a mounting surface contoured to provide a downwardly opening recess for receiving the horn button in the hub. My desk board also provides radially outwardly extending abutments for engaging, respectively, the spokes of the steering wheel further to stabilize the desk board on the wheel.

Other objects and features of my present invention will become apparent as this description progresses.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
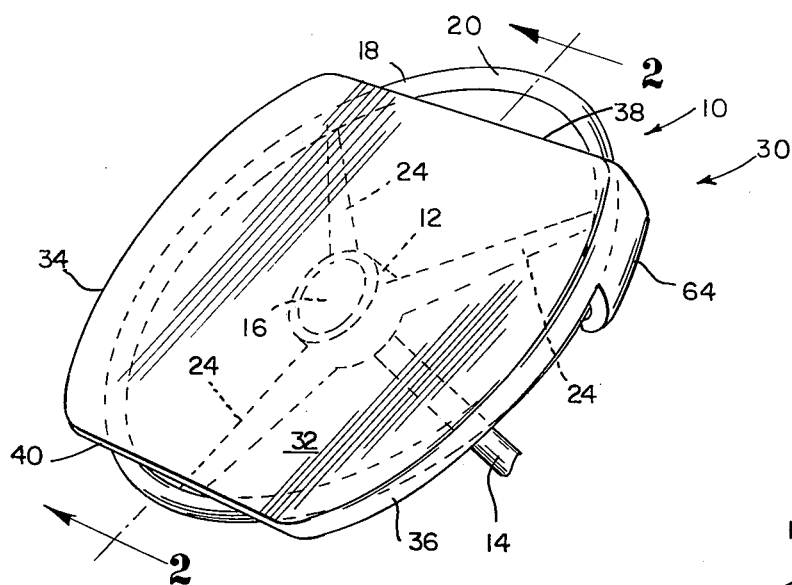
FIG. 1 is a perspective view of a truck steering wheel with my desk board mounted thereon.
Figure 2:
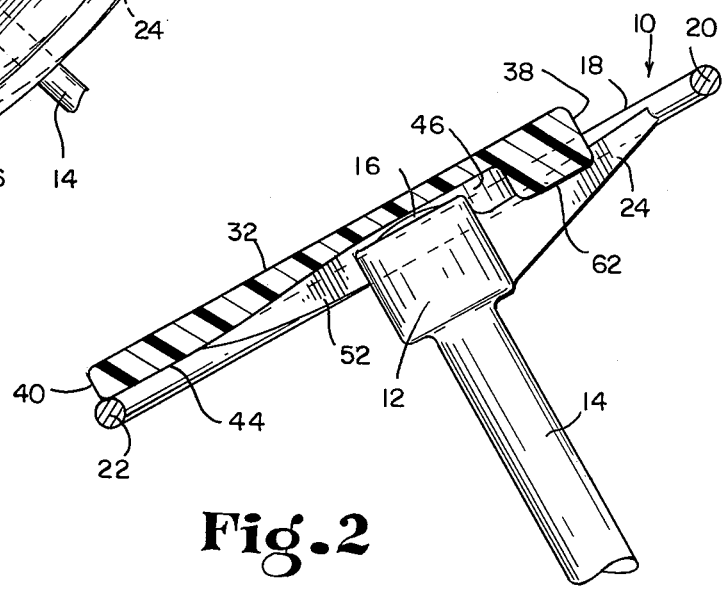
FIG. 2 is a fragmentary sectional view taken generally along the lines 2—2 in FIG. 1 and slightly enlarged.
Figure 3:
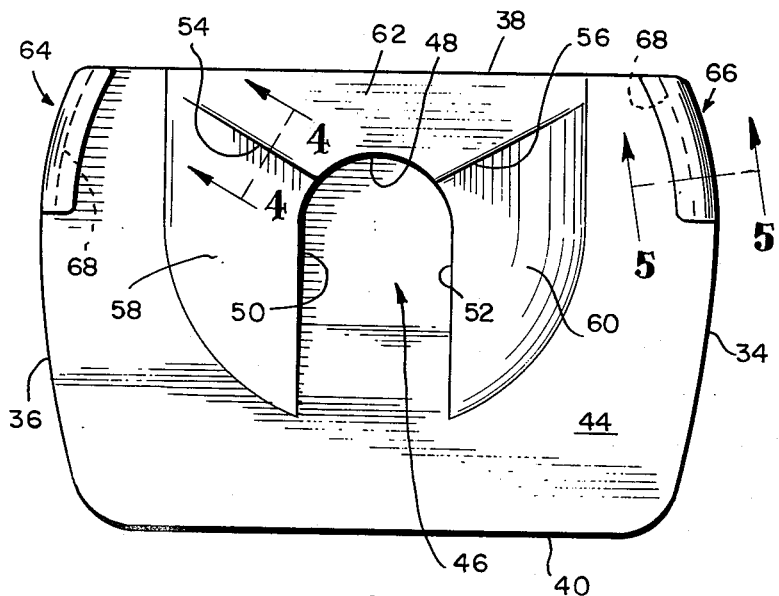
FIG. 3 is a plan view of the bottom side or mounting surface side of the desk board.
Figure 4:
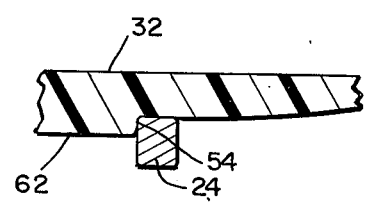
FIG. 4 is a sectional view of FIG. 3 taken generally along the line 4—4.
Figure 5:
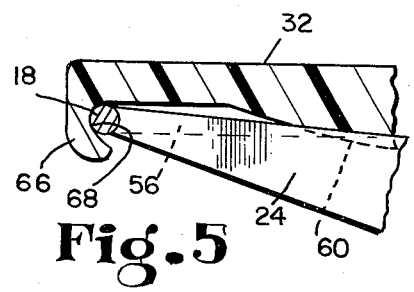
FIG. 5 is a fragmentary sectional view taken from FIG. 3 generally along the line 5—5.

Referring now particularly to the drawings, it will be seen that I have shown a steering wheel 10 comprising a hub 12 mounted upon the conventional steering post 14 and with a horn button 16 extending axially upwardly from the upper end of the hub 12. The outer peripheral rim of the wheel 10 is designated by the reference numeral 18 while the reference numeral 20 indicates the top of the rim, i.e., the part of the rim most remote from the driver, while the reference numeral 22 indicates the bottom of the rim or that portion of the rim closest to the driver. Generally, the steering post 14 is inclined upwardly and rearwardly such that the steering wheel is slanted with the rim 18 lying in a plane inclined relative to horizontal, i.e., inclined from the top 20 downwardly to the bottom 22. A plurality of spokes 24 extend radially outwardly to support the rim 18 upon the hub 12. The steering wheel just described is a typical steering wheel of a large truck. Most trucks with which I am familiar have such steering wheels.

My desk board, indicated generally at 30, provides a generally flat, upwardly facing work surface 32, the illustrative embodiment of which has generally curved sides 34, 36 and generally straight top and bottom edges 38, 40. The curved sides 34, 36 may preferably be only slightly overhanging the rim 18 of the wheel 20, i.e., the width of the board 30 may preferably be only slightly larger than the diameter of the wheel 18. The upper edge 38 may preferably be slightly lower than the upper part 20 of the rim 18 while the lower edge 40 may preferably be slightly above the lower part 22 of the rim. In other words, the board 30 is proportioned and designed not to be substantially larger than the wheel, yet to provide a work surface about the size of the wheel.

The board 30 is formed to provide a downwardly facing mounting surface 44 which rests upon the wheel 10. This mounting surface is proportioned and contoured to provide a centrally located, downwardly opening recess 46 for receiving the horn button 16 and the upper end of the hub 12. The illustrative recess 46 is generally an inverted U-shaped recess opening toward the lower edge 40 and having a curved base 48 and sides 50, 52 extending generally perpendicularly to the edge 40.

The reception of the upper portion of the hub 12 and the horn 16 in the recess 46 serves to stabilize the board on the wheel 12. Further to stabilize the board 30 upon the wheel 10, I provide a pair of generally radially extending, downwardly directed abutments 54, 56 for engaging, respectively, the spokes 24 extending upwardly and outwardly when the wheel is in its position shown in FIG. 1. Finally, to hold the board 30 securely on the wheel 10, I provide a pair of downwardly projecting means 64, 66 for engaging the upper part 20 of the rim. Each downwardly projecting means 64, 66 which may be integrally molded upon the main body portion of the board 30 extends downwardly and then radially inwardly to provide a peripherally extending groove portion 68 receivably engaging the rim 18.

With the board 30 mounting surface 44 contoured as illustrated, my board can be easily mounted upon the wheel 10 by placing it over the wheel an sliding it downwardly toward the lower part 22 of the rim 18 to engage the abutments 54, 56 and the downwardly projecting means 64, 66. In other words, the board is moved downwardly in the direction of the opening of the recess 46. The recess 46 and the abutments 54, 56 are defined in the illustrative embodiment, by convex portions 58, 60 on each side of the recess 46 and, adjacent the upper edge 38, a downwardly extending portion 62 defining the two abutments 54, 56 and the curved base 48 of the recess.

My desk board will fit most steering wheels of trucks to provide a very stable and convenient desk working space for truck drivers.

I claim:

1. For use on a truck steering wheel having a central hub, an outer peripheral rim, a plurality of spokes extending radially outwardly from the hub to support the rim and a horn button on the hub extending axially above the level of the rim, said wheel being rotatable about an inclined axis such that it inclines downwardly from the top of its rim to the bottom of the rim, a removable desk board providing a generally flat upwardly facing work surface and a downwardly facing mounting surface, said mounting surface being contoured to provide a downwardly opening recess for receiving said horn button and generally radially extending downwardly directed abutments for engaging, respectively, said spokes to steady said board on said wheel such that said board can rest on said rim, downwardly projecting means for engaging the top of said rim, said recess opens also toward the bottom of said rim such that said board can move downwardly in a plane transverse to the inclined wheel axis over the wheel toward the bottom of the wheel rim to engage said projecting means with the top of said rim.

2. The invention of claim 1 in which said abutments face generally the bottom of said rim to accommodate such movement of said board toward the bottom of the rim.

* * * * *